Oct. 9, 1934.  E. HOPKINSON  1,976,344
METHOD AND APPARATUS FOR THE MANUFACTURE OF ELASTIC THREAD
Filed Feb. 6, 1932
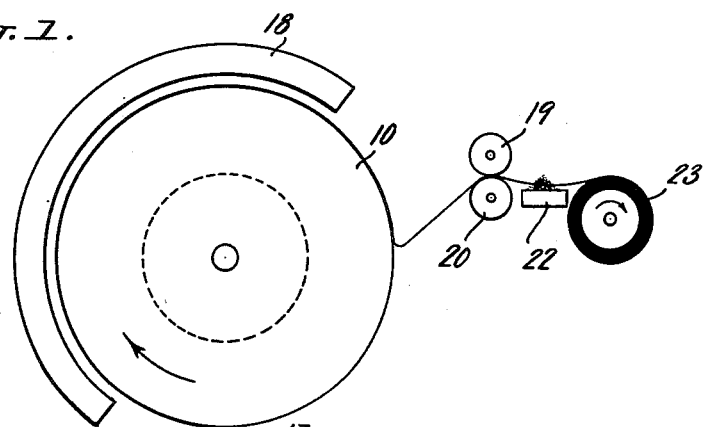
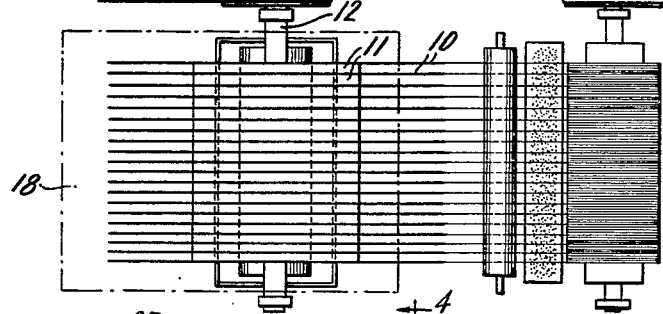
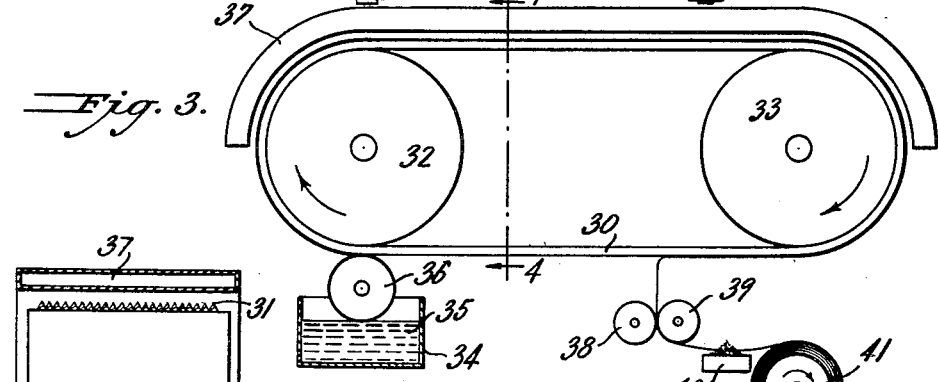
INVENTOR
ERNEST HOPKINSON
BY
ATTORNEY Patented Oct. 9, 1934

1,976,344

UNITED STATES PATENT OFFICE 1,976,344

METHOD AND APPARATUS FOR THE MANUFACTURE OF ELASTIC THREAD

Ernest Hopkinson, New York, N. Y., assignor to Revere Rubber Company, Providence, R. I., a corporation of Rhode Island Application February 6, 1932, Serial No. 591,352

2 Claims. (Cl. 18—8)

This invention relates to the manufacture of elastic thread and more particularly to fine thread, and has for an object the continuous and rapid production of such thread in a simple and inexpensive manner from a suitable rubber containing fluid.

Other objects and advantages will appear from the following description, reference being made to the accompanying drawing illustrating certain present preferred forms of practicing the invention, in which:

Figure 1 is a side view of one form of apparatus embodying the invention;

Fig. 2 is a top view of the apparatus of Fig. 1;

Fig. 3 is a side view of another form of apparatus embodying the invention; and

Fig. 4 is a section on line 4—4 of Fig. 3.

Referring to Figures 1 and 2, circular discs 10, separated by spacers 11, and mounted on shaft 12, are made to rotate in a clockwise direction, as shown by the arrow, by means of a pulley 13 driven by a belt 14 from any source of power (not shown). Beneath the rotating discs is a tank 15 containing rubber-containing fluid 16 in which is placed a pick-up roll which just contacts with the edge of the rotating discs 10. The pick-up roll 17 dips into the rubber-containing fluid sufficient to wet its rotating surface therewith, and then applies adhering the rubber-containing fluid to the edge of the discs 10 as they rotate and contact the surface of the pick-up roll.

The discs 10 with the rubber-containing fluid on the edge thereof pass through a heater 18 adapted to dry and vulcanize the rubber-containing fluid. After the discs have passed through the heater 18, nip rolls 19 and 20 remove the vulcanized thread and the thread is then passed through a talcer 22 and wound up on a reel or the like 23 driven through pulley 24 by belt 25 connected to a source of power, not shown.

In Figs. 3 and 4 is shown another form of apparatus embodying the same principle as the apparatus of Figs. 1 and 2. An endless band or a series of endless bands 30 with sharp edges 31 are made to travel around drums 32 and 33. Under the lower run of the bands is placed a tank 34 containing a rubber-containing fluid 35 in which is placed a pick-up roll 36 which just contacts with the sharp edges 31 of the travelling bands. As described in reference to Figures 1 and 2, the pick-up roll 36 dips into the rubber-containing fluid sufficient to wet the surface therewith and then applies the rubber-containing fluid to the edges 31 as they travel around the drums 32 and 33.

The bands after leaving the pick-up roll travel through a heater 37 adapted to vulcanize the rubber on the edges of the bands and after the bands leave the vulcanizer, the vulcanized deposit is removed by means of nip rolls 38 and 39 and is passed through a talcer 40 and wound upon a reel or the like 41.

The rubber-containing fluid from which the elastic thread is made may be in the form of a solvent solution of rubber, or it may be an aqueous dispersion of rubber such as a natural or artificial latex, or a solution or dispersion of a synthetic material resembling rubber. In the embodiments shown, the rubber deposit is vulcanized, but if a rubber containing fluid which is prevulcanized or which does not contain vulcanizing ingredients is used, the heat of the driers need only be sufficient to dry the deposit before removal in the form of a continuous thread.

In the operation of the embodiments of the invention as shown in Figures 1 and 3, a rubber containing fluid is applied to a thin travelling edge surface, the fluid dried on the travelling edge, vulcanized if desired, and removed from the edge in the form of a continuous elastic thread. The thread after being removed is passed through a talcing machine and thereafter wound up on reels or the like for further use.

While the invention has been described more or less in detail, it is not intended thereby to so limit the invention, inasmuch as the examples herein set forth are merely illustrative thereof and various modifications may be made without departing from the invention, the scope of which is indicated in the following claims.

Having thus described my invention, what I claim and desire to protect by Letters Patent is:

1. In the method of making elastic thread, the steps comprising applying a rubber-containing fluid to a plurality of parallel projecting edge surfaces on a travelling belt, forming a solid rubber deposit from said fluid on said edge surfaces, and removing the rubber deposit from said surfaces in the form of continuous threads.

2. In an apparatus for the manufacture of elastic thread, a travelling belt comprising on its face a plurality of parallel projecting edge surfaces, means for applying a rubber, containing fluid to said edge surfaces, means for drying said fluid on said edge surfaces, and means for removing the dried deposit in the form of continuous threads.

ERNEST HOPKINSON.